Aug. 2, 1955  F. D'OZOUVILLE  2,714,435
VARIABLE SPEED TRANSMISSION DEVICES
Filed March 13, 1950
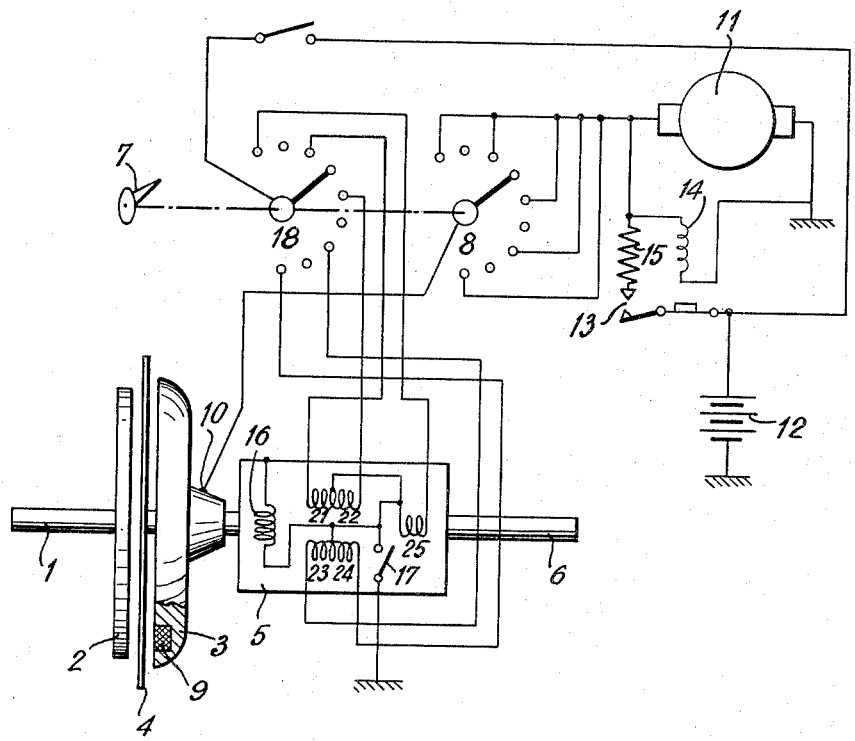
INVENTOR:
FRANCOIS D'OZOUVILLE
BY:

United States Patent Office 2,714,435
Patented Aug. 2, 1955

2,714,435

VARIABLE SPEED TRANSMISSION DEVICES

François d'Ozouville, Paris, France, assignor to Siper S. A., Emsallah, Tangier, a corporation of the Tangier Zone Application March 13, 1950, Serial No. 149,366

Claims priority, application Switzerland October 26, 1949

5 Claims. (Cl. 192—3.5)

The present invention relates to a variable speed transmission device for connecting a driving shaft to a driven shaft and comprising a multiple-speed gear mechanism, a friction clutch and electro-magnetic control means for this clutch.

The invention aims at simplifying the operation of such a device by reducing the number of operations necessary to change from one speed to another and to change from a neutral position into a selected speed, and also to reduce the number of controls which must be actuated to effect such operations.

The transmission device according to the invention is characterized by means for the simultaneous control of the multiple-speed gear mechanism and of the said electro-magnetic control means, and by additional means designed to regulate the operation of these electro-magnetic means in dependence of the speed of revolution of the driving shaft.

The accompanying drawing shows, diagrammatically and by way of example, an embodiment of the transmission device according to the invention.

The transmission device shown comprises a driving shaft 1 on which is mounted a flywheel 2, and an electro-magnet 3 arranged to clamp a disk 4 between the flywheel 2 and the electro-magnet, the disk 4 driving the primary shaft of a multiple-speed gear mechanism 5, through which the shaft 6 is driven. The winding 9 of the electro-magnet 3 is connected at one end to the mass of the device and at the other, through a slip-ring 10 and a brush to a source of electric voltage. This source is provided by a dynamo 11, which is driven to revolve at a speed proportional to that of the driving shaft 1. This dynamo also serves to charge a battery of accumulators 12, to which it is connected by a switch 13, which is actuated by an electro-magnet 14 as soon as the voltage of the dynamo is sufficient to charge the battery. A resistance 15 is included in the charging circuit of the battery in order to limit the charging current.

To couple the shaft 1 to the shaft 6 through the gear-mechanism 5 current is sent through the winding 9 of the electro-magnet 3 and the friction clutch is engaged by means to be described hereinafter. This clutch acts progressively, due to the fact that the shaft 1 and the dynamo 11 revolve relatively slowly at the moment and that the voltage applied to the winding 9 is therefore relatively low. The clutch may thus slip until the driving torque supplied by the shaft 1 and the resisting torque transmitted by the shaft 6 to the disk 4 through the gear-mechanism 5 have balanced each other. In order to achieve this, it is naturally necessary to increase progressively the energy supplied to the engine and to the shaft 1, in the form of fuel for instance.

When a device of the type described is fitted to a motor car, the usual clutch control pedal of this motor car can be omitted. This suppression renders the driving of the vehicle much more simple, and, due to the progressive action of the friction clutch of the device, the passage from one speed to another or from the neutral position into a speed is rendered very easy. The dynamo 11, which is coupled to the shaft 1, provides means for regulating the operation of the electro-magnet 3, which forms electro-magnetic clutch control means.

The gear-box 5 is controlled by electro-magnetic means. These means consist of a set of electro-magnets 21 to 25, each of which is arranged to engage with the members of the gear-mechanism corresponding to a particular forward gear-ratio or to a reverse gear-ratio. This gear-mechanism also comprises a locking electro-magnet 16, which is short-circuited by means of a switch 17 when the gear-mechanism is in its neutral position. The gear-mechanism is controlled by a selector 18 actuated by a gear lever 7, and the clutch control switch 8 is coupled to this selector in such a manner that it is closed whenever one of the forward gear-ratios or the reverse gear-ratio of the gear-mechanism is effective, and that it is open when the gear-mechanism is in neutral position, the selector being then in any intermediate position.

The gear-mechanism of the transmission device shown could be of the type described in the U. S. Patent No. 2,641,637.

The transmission device described above can be fitted to any vehicle having a gear-mechanism. It can also be applied to machine-tools fitted with such a gear-mechanism.

What I claim is:

1. A variable speed transmission device for connecting a driving shaft with a driven shaft and having a multiple speed gear mechanism arranged to be operated by electromagnetic means controlled by a change speed lever being adapted to take any one of a plurality of working positions, comprising, in combination, an electromagnetically operated friction clutch; an electric circuit for said clutch; a clutch-control switch inserted in said circuit; an electric selector switch arranged to render selectively effective said electromagnetic means operating said gear mechanism so as to bring the same into any desired operating condition, said clutch-control switch and said selector switch being mechanically coupled with said lever, said clutch-control switch being arranged for interrupting said electric circuit of said clutch so as to cause disengagement of said clutch when said lever is actuated for changing speeds; and means responsive to the speed of the driving shaft for controlling the operation of said clutch whereby said clutch is automatically and progressively engaged in response to the speed of the driving shaft when said lever is in any of said working positions.

2. A variable speed transmission device for connecting a driving shaft with a driven shaft and having a multiple speed gear mechanism arranged to be operated by electromagnetic means controlled by a change speed lever being adapted to take any one of a plurality of working positions, comprising, in combination, a plurality of actuating solenoids forming part of said electromagnetic means; electric circuits associated, respectively, with said actuating solenoids; an electromagnetically operated friction clutch; an electric circuit for said clutch; a clutch-control switch inserted in said circuit; an electric selector switch arranged to close selectively said electric circuits associated with said actuating solenoids, said clutch-control switch and said selector switch being mechanically coupled with said lever, said clutch-control switch being arranged for interrupting said electric circuit of said clutch so as to cause disengagement of said clutch when said lever is actuated for changing speeds; and means responsive to the speed of the driving shaft for controlling the operation of said clutch whereby said clutch is automatically and progressively engaged in response to the speed of the driving shaft when said lever is in any of said working positions.

3. A variable speed transmission device for connecting a driving shaft with a driven shaft and having a multiple speed gear mechanism arranged to be operated by electromagnetic means controlled by a change speed lever being adapted to take any one of a plurality of working positions, comprising, in combination, a plurality of actuating solenoids forming part of said electromagnetic means; electric circuits associated, respectively, with said actuating solenoids; a locking solenoid forming part of said electromagnetic means and being arranged for locking said multiple gear mechanism in any of the operating conditions thereof; an electromagnetically operated friction clutch; an electric circuit for said clutch; a clutch-control switch inserted in said circuit; an electric selector switch arranged to close selectively said electric circuits associated with said actuating solenoids, said locking solenoid being energized under control of said electric selector switch whenever said gear mechanism arrives in an operating condition thereof, said clutch-control switch and said selector switch being mechanically coupled with said lever, said clutch-control switch being arranged for interrupting said electric circuit of said clutch so as to cause disengagement of said clutch when said lever is actuated for changing speeds; and means responsive to the speed of the driving shaft for controlling the operation of said clutch whereby said clutch is automatically and progressively engaged in response to the speed of the driving shaft when said lever is in any of said working positions.

4. A variable speed transmission device for connecting a driving shaft with a driven shaft and having a multiple speed gear mechanism arranged to be operated by electromagnetic means controlled by a change speed lever being adapted to take any one of a plurality of working positions, comprising, in combination, a plurality of actuating solenoids forming part of said electromagnetic means; electric circuits associated, respectively, with said actuating solenoids; a locking solenoid forming part of said electromagnetic means and being arranged for locking said multiple gear mechanism in any of the operating conditions thereof; an electromagnetically operated friction clutch; an electric circuit for said clutch; a clutch-control switch inserted in said circuit; an electric selector switch arranged to close selectively said electric circuits associated with said actuating solenoids, said locking solenoid being energized under control of said electric selector switch whenever said gear mechanism arrives in an operating condition thereof; a terminal common to said actuating solenoids and said locking solenoid, said locking solenoid being connected in series with said actuating solenoids, said clutch-control switch and said selector switch being mechanically coupled with said lever, said clutch-control switch being arranged for interrupting said electric circuit of said clutch so as to cause disengagement of said clutch when said lever is actuated for changing speeds; and means responsive to the speed of the driving shaft for controlling the operation of said clutch whereby said clutch is automatically and progressively engaged in response to the speed of the driving shaft when said lever is in any of said working positions.

5. A variable speed transmission device for connecting a driving shaft with a driven shaft and having a multiple speed gear mechanism arranged to be operated by electromagnetic means controlled by a change speed lever being adapted to take any one of a plurality of working positions, comprising, in combination, a plurality of actuating solenoids forming part of said electromagnetic means; electric circuits associated, respectively, with said actuating solenoids; a locking solenoid forming part of said electromagnetic means and being arranged for locking said multiple gear mechanism in any of the operating conditions thereof; an electromagnetically operated friction clutch; an electric circuit for said clutch; a clutch-control switch inserted in said circuit; an electric selector switch arranged to close selectively said electric circuits associated with said actuating solenoids, said locking solenoid being energized under control of said electric selector switch whenever said gear mechanism arrives in an operating condition thereof; a terminal common to said actuating solenoids and said locking solenoid, said locking solenoid being connected in series with said actuating solenoids, a switch normally short-circuiting said locking solenoid and arranged to be mechanically actuated by said gear mechanism so as to be opened whenever said gear mechanism arrives at an operating condition thereof, thus energizing said locking solenoid, said clutch-control switch and said selector switch being mechanically coupled with said lever, said clutch-control switch being arranged for interrupting said electric circuit of said clutch so as to cause disengagement of said clutch when said lever is actuated for changing speeds; and means responsive to the speed of the driving shaft for controlling the operation of said clutch whereby said clutch is automatically and progressively engaged in response to the speed of the driving shaft when said lever is in any of said working positions.

References Cited in the file of this patent

UNITED STATES PATENTS

| | | |
|---|---|---|
| 654,632 | Heilman | July 31, 1900 |
| 1,806,158 | Giger | May 19, 1931 |
| 1,836,298 | Winther | Dec. 15, 1931 |
| 2,049,738 | Hill | Aug. 4, 1936 |
| 2,197,480 | Neill | Apr. 16, 1940 |
| 2,206,586 | Struck | July 2, 1940 |
| 2,302,005 | Caves | Nov. 17, 1942 |

FOREIGN PATENTS

| | | |
|---|---|---|
| 482,828 | France | Feb. 3, 1917 |
| 516,730 | Great Britain | Jan. 10, 1940 |
| 610,519 | Great Britain | Oct. 18, 1948 |
| 610,595 | Great Britain | Oct. 18, 1948 |
| 619,223 | Great Britain | Mar. 7, 1949 |